Figures 1, 2:
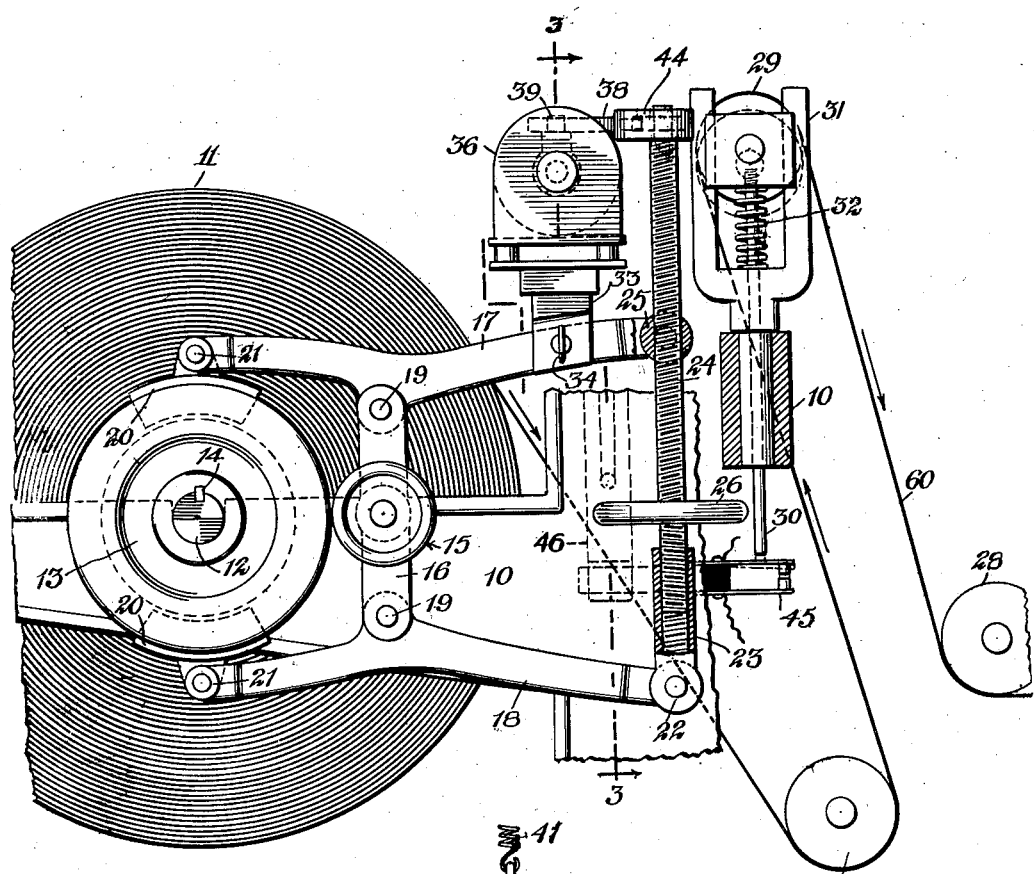

Aug. 1, 1939.  C. P. DYMECK  2,168,023
AUTOMATIC BRAKE MECHANISM FOR FEEDING MATERIAL FROM A ROLL
Filed Nov. 17, 1936  2 Sheets-Sheet 1

WITNESSES

INVENTOR
Charles P. Dymeck
BY
ATTORNEYS

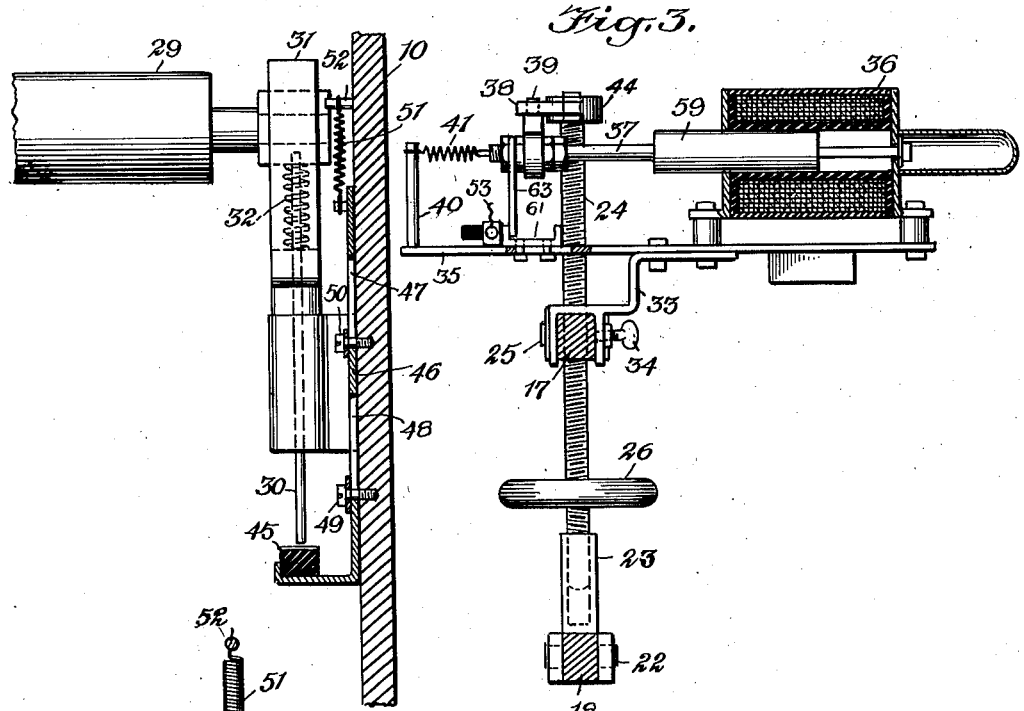

Patented Aug. 1, 1939

2,168,023

UNITED STATES PATENT OFFICE 2,168,023

AUTOMATIC BRAKE MECHANISM FOR FEEDING MATERIAL FROM A ROLL

Charles Peter Dymeck, New York, N. Y.

Application November 17, 1936, Serial No. 111,242

6 Claims. (Cl. 242—75)

This invention relates to a mechanism for printing presses, but is adaptable to any device where material is fed from a roll. The invention relates more particularly to automatic braking mechanism to control the speed of the roll of material and to prevent the material from being fed too fast or under too great a tension.

In the modern presses and machines of like nature it is customary to place a brake upon the roll of material which is being fed, in order to prevent the roll from unwinding too quickly and to control it so that it will be fed as desired. It is customary in a device of this character to apply some braking means to such rolls to prevent the unwinding of the roll and the tension of the brake is ordinarily controlled by hand. This requires considerable skill and constant attention by the operator of the brake, so that the brake is set sufficiently loosely to prevent tearing of the material and yet sufficiently tightly to prevent the unwinding of the roll. Naturally, as the roll of material is unwound, the circumference of the roll is lessened and the speed of the rotation of the roll is increased. The increased speed causes increased friction, slipping of the brake, and expansion of the material, and, consequently, a tightening of the brake.

An object of the present invention is to provide an automatic means for controlling brakes and one which will maintain the proper tension on the roll of material, providing for the various forces which have been enumerated above.

Another object of the invention is to provide a mechanism which is relatively simple in its nature and economical in its construction and operation.

While, as stated above, this invention is applicable to any machine which feeds material from a roll, I have shown it in connection with a printing press in order to illustrate its operation.

Other objects and advantages of the invention will be apparent as the description proceeds.

In the accompanying drawings,

Figure 1 is a side view of that part of the press supporting the roll and showing the braking mechanism, Fig. 2 is a detailed view of the ratchet mechanism operating the screw which controls the brake, Fig. 3 is a sectional view taken on the line 3—3 of Fig. 1, Fig. 4 is a diagrammatic view showing the wiring of the device, and Fig. 5 is a diagrammatic view showing the make-and-break mechanism of the solenoid.

Referring to the drawings, and particularly Fig. 1, it will be seen that I provide the usual frame 10, upon which is mounted a roll of paper 11 on a spindle 12. The spindle 12 is locked to a drum 13 by means of a key 14. Mounted on the frame 10 there is a braking mechanism 15 consisting of a bar 16 at either end of which arms 17 and 18 are pivoted at 19. Brake shoes 20 are pivoted by means of joints 21 at one end of the arms 17 and 18. The other end of the arm 18 is pivoted at 22 to a socket 23 which receives a screw 24. On the end of the arm 17 there is a threaded socket 25 which cooperates with the screw 24. The screw 24 is likewise equipped with a handwheel 26 which provides for the manual operation of the screw. It will be seen that by turning the screw 24 in one direction, the arms 17 and 18 will be forced apart at their outer ends and the pressure on the brake shoes 20 will be increased, while, when the screw is turned in the opposite direction, the pressure will be decreased. The ordinary device of this type is also provided with rollers 27 and 28. A roller 29 is mounted on a spring-supported rod 30 and is pressed outwardly from its supporting mechanism 31 by means of a spiral spring 32.

In operation, the paper is fed off the roll 11, over the roller 27, back over the roller 29 and over the roller 28 to the press. It will be seen that the brake shoes 20 pressing upon the drum 13 will control the tension under which the paper is drawn, and, as previously pointed out, the turning of the screw 24 will increase or decrease the tension.

Fastened to the arm 17 there is a clamp 33 which may be pivotally fastened, or, as shown in the drawings, may be fastened by a thumb screw 34. This clamp 33 supports a bar 35 on which a conventional solenoid 36 is mounted. The solenoid is connected by means of a bar 37 to an arm 38 by a bolt or other pivotal means 39. At the end of the bar 35 there is a post 40 on which is attached a tension spring 41 connecting with the rod 37. The end of the screw 24 is provided with a ratchet wheel 42 which cooperates with a spring-pressed pawl 43 situated in a casing 44 at the outer end of the arm 38. As previously explained, the roller 29 is situated in the fork 31 and held in its outward position by the spring 32. Fastened to the roller 29 there is a rod 30 which is adapted to engage with the contact points 45 when the pressure on the roller 29 is sufficient to depress the spring 32. The contact points 45 are mounted on a bar 46, which bar is provided with slots 47 and 48 through which the screws 49 and 50 fasten the bar 46 to the frame 10. The bar 46 is also provided at its upper end with a spring 51 which fastens to a rod 52. Thus, it will be seen that if the pressure of the rod 30 on the contact points 45 becomes too great, the bar 46 may slide downwardly along the lines of the slots 47 and 48 and against the spring 51 in order to avoid breaking of the contact points. When the pressure is relieved, the spring 51 will return the bar 46 to its normal position.

Fig. 4 shows the circuit controlling the operation of the device which provides the negative wire 53 leading to the coil 54 of the solenoid 36 and to the negative pole 55 of the contact points 45. The positive wire 56 leads to the positive pole 57 of the contact points 45. Between the coil 54 of the solenoid 36 and the wire 56 a condenser 58 is provided to prevent the jumping of a spark at the contact points 45. The solenoid is provided with a core 59 which is attached to the rod 37.

In operation, the roll of paper 11 is mounted on the spindle 12 and the brake is set by the handwheel 26. If the tension is too great, the tension on the web 60 over the roller 29 will cause the depression of the spring 32 and the rod 30 will close the contact points 45. This will energize the solenoid and draw the core 59 in the coil 54, at the same time moving the arm 38 in a counter-clockwise direction. The pawl 43 will engage the ratchet 42 and turn the screw 24, causing the arms 17 and 18 to be moved together and the pressure on the brake shoes 20 to be lessened. This will naturally decrease the tension of the web 60 and the roller 29 will be forced by the spring 32 back to its normal position, thus withdrawing the rod 30 and allowing the contact points 45 to become separated and break the circuit. The solenoid will then become de-energized and the spring 41 will return the arm 38 to its previous position. The device will then be ready for another operation as the tension on the web 60 becomes greater due to the increased revolutions of the roll 11. Should the handwheel be tightened to such an extent as to cause the spring 32 to be depressed more than enough to close the contact points 45, the bar 46 will move downwardly against the spring 51 and in line with the slots 47 and 48 to prevent the breakage of the contact points 45. As the pressure is lessened due to the turning of the screw 24 and the lessening of the pressure on the brake shoes 20, the spring 51 will return the bar 46 to its normal position.

While, in the ordinary printing press, one operation of the device will loosen the brake sufficiently, in certain types of machines it may be necessary to turn the screw a second time. I have accordingly provided a make-and-break connection which is best shown in Fig. 5. Attached to the end of the rod 37 there is a pole 63. This pole is adapted to contact with the slidable switch member 61, which operates the conventional spring switch 62. It will be seen that when the core 59 is drawn into the solenoid 36, the pole 63 will operate the switch member 61 and thus open the circuit passing through the wire 53 and de-energize the solenoid 36. The spring 41 will then immediately return the rod 37 and the core 59 to the open position and the spring switch 62 will again close the circuit. If the pressure on the roller 29 is still sufficient to cause the rod 30 to close the contact points 45, the solenoid will again become energized and the operation will taken place all over again.

It is obvious that many variations in the construction shown may be made and that many would be advisable in adapting my device to different types of machines without changing the principles on which the device is operated.

I claim:

1. In a device of the character described having a braking mechanism, a screw to operate said mechanism, an arm connected with the end of said screw whereby the movement of the arm in one direction will turn the screw in the same direction, a solenoid having a core pivoted to said arm, and means for energizing said solenoid to move said arm, to turn said screw and to lessen the tension of said brake mechanism.

2. In a device of the character described, having a braking mechanism, a screw to operate said mechanism, a ratchet on one end of said screw, an arm bearing a pawl connected with said ratchet, a solenoid having a core pivoted to said arm and means for energizing said solenoid, whereby the movement of said core moves said arm, turning the screw and lessening the tension of said brake.

3. In a machine for feeding material from a roll, a brake to control the rotation of said roll, a screw controlling the tension of said brake, an arm operably connected to one end of said screw whereby the movement of the arm in one direction will turn the screw in the same direction, a solenoid connected to said arm, and means for energizing said solenoid to move said arm and lessen the tension on said brake, when said tension reaches a pre-determined degree.

4. In a machine for feeding material from a roll, a brake to control the rotation of said roll, a screw controlling the tension of said brake, an arm operably connected with said screw, a solenoid connected to said arm, and means for energizing said solenoid to move said arm and lessen the tension on said brake, when said tension reaches a pre-determined degree, said means comprising a depressible roller, a rod connecting with said roller, and contact means operated by said rod, when said roller is depressed to a certain degree.

5. In a device of the character described having a brake, a screw controlling the tension of said brake, ratchet on one end of said screw, an arm bearing a pawl connected with said ratchet, a solenoid having a core pivoted to said arm, and means for energizing said solenoid when the tension of said brake becomes excessive.

6. A braking device for controlling the tension of a brake for a web-feeding machine, including a screw operating said brake, a ratchet on one end of said screw, an arm bearing a pawl connecting with said ratchet, a solenoid having a core pivoted to said arm, a spring to hold normally said core out of said solenoid and means for energizing said solenoid to draw said core into the solenoid, said means including a make-or-break switch whereby after the core has been drawn into the solenoid, the solenoid will be de-energized and the core returned by said spring out of said solenoid.

CHARLES PETER DYMECK.